United States Patent [19]

Nio et al.

[11] Patent Number: 4,728,974

[45] Date of Patent: Mar. 1, 1988

[54] APPARATUS FOR SUPPORTING AN IMAGING DEVICE

[75] Inventors: Satoru Nio; Hajime Fujii, both of Kitakyushu, Japan

[73] Assignee: Yaskawa Electric Manufacturing Co., Ltd., Kitakyushu, Japan

[21] Appl. No.: 868,752

[22] Filed: May 30, 1986

[30] Foreign Application Priority Data

May 31, 1985 [JP] Japan .................................. 60-116560

[51] Int. Cl.$^4$ ............................................. G03B 29/00
[52] U.S. Cl. ......................................... 354/81; 354/76; 901/44; 358/901; 219/124.34
[58] Field of Search ................. 354/75, 76, 79, 81; 901/44, 46, 47; 358/93, 100, 101, 901; 350/227, 561; 219/124.34

[56] References Cited

U.S. PATENT DOCUMENTS

| | | | |
|---|---|---|---|
| 4,441,817 | 4/1984 | Pryor | 250/227 |
| 4,460,826 | 7/1984 | Pryor | 250/227 |
| 4,578,561 | 3/1986 | Corby, Jr. et al. | 219/124.34 |
| 4,667,082 | 5/1987 | Shibata et al. | 219/124.34 |
| 4,675,502 | 6/1987 | Haefner et al. | 219/124.34 |

FOREIGN PATENT DOCUMENTS

| | | | |
|---|---|---|---|
| 0208406 | 1/1987 | European Pat. Off. | 901/47 |
| 0004964 | 1/1978 | Japan | 901/47 |

Primary Examiner—Russell E. Adams
Attorney, Agent, or Firm—Cushman, Darby & Cushman

[57] ABSTRACT

According to the invention, the fiber scope is inserted into the highly rigid tube and this tube is clamped as a rigid member by the robot wrist (or fiber scope supporting device) and camera supporting device, thereby allowing the camera supporting device and tube to move intergrally with the robot wrist. Therefore, no twisting of the fiber scope occurs within the operating range of the robot wrist axis. Also, even at any position in the operating range of the robot wrist axis as well, the angle of bend of the fiber scope can be held to a constant value below the allowable bending angly of the fiber scope. Consequently, it has been possible to realize an imaging device in which interference between the object to be worked and the optical system is remarkably improved.

18 Claims, 6 Drawing Figures

F I G. 2
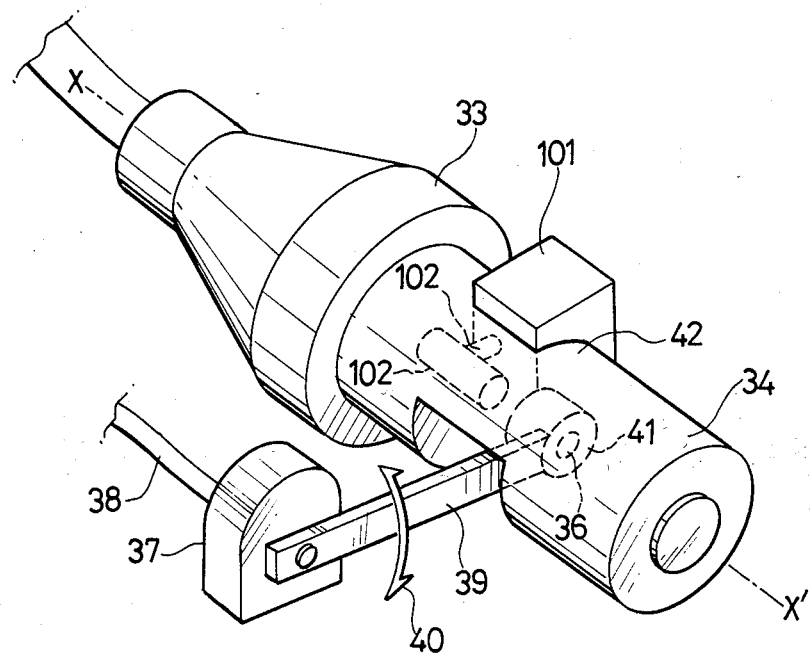

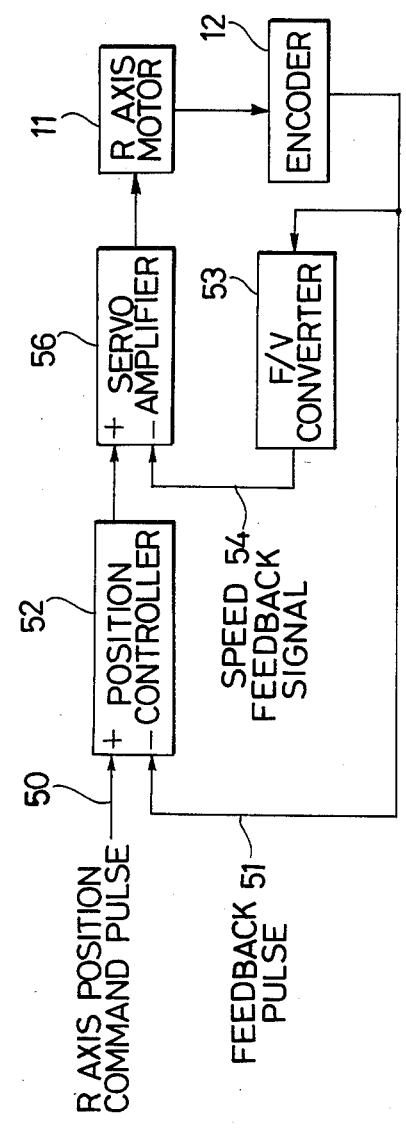

001
APPARATUS FOR SUPPORTING AN IMAGING DEVICE

BACKGROUND OF THE INVENTION

1. Field of the Invention

The present invention relates to an apparatus for supporting and, more particularly, to an apparatus of the type to attach and support a camera-supporting device equipped with a camera therein and a fiber scope to the wrist of a robot having a swing axis and a twist axis.

2. Description of the Related Art

As means for automating the work of industrial robots, there have been put into practical use industrial robots equipped with imaging equipment in which a camera is attached to the wrist of the robot together with a working tool such as a welding torch, sizing gun, deburring tool, screw fastening tool or clamping hand.

In these robots, a problem occurs with respect to the approach to an object to be worked which has a complicated shape. Practically speaking, an interference problem occurs between the object to be worked and the optical system of the camera. The large-sized camera optical system obstructs the approach to the narrow portion of the object to be worked, so that this narrow portion becomes a dead angle or dead space and the visual function of the optical system is obstructed. To solve this problem, there has been considered an imaging apparatus in which a fiber scope is attached to the robot wrist and an image pickup signal which is obtained at the edge of the fiber scope is transmitted through the fiber scope to a camera which is arranged at a remote position, for example, at the position of the upper arm of the robot, thereby miniaturizing the camera optical system. However, in this imaging apparatus, there occurs the problem that the bundles of the optical fibers in the image pickup section on the object side of the fiber scope, which is constituted by tens of thousands of optical fibers, in the image pickup section on the camera side, and at the position between the object and camera sides are twisted and bent due to the motion of the robot wrist, with the result that the optical fiber lines are severed. If the motion of the robot wrist axis is restricted such that the degrees of twist and bend of the fiber scope lie within allowable ranges, the moving range of the robot wrist in turn becomes too small, with the result that the function as the robot cannot be efficiently utilized.

SUMMARY OF THE INVENTION

It is an object of the present invention to provide an apparatus for supporting in which the fiber scope is not twisted within the operating range of the robot wrist and, at the same time, the degree of bend of the fiber scope can be held to a constant value below an allowable bend value of the fiber scope at any position within the operating range of the robot wrist axis, thereby enabling interference between the object to be work and the optical system to be remarkably improved.

The apparatus for supporting according to the present invention comprises: a tube having high rigidity into which a fiber scope is inserted and which couples a camera supporting device with a robot wrist; a first identical moving member for allowing the camera-supporting device to perform the same motion as the swing axis in the direction of the swing axis around the rotational center of the swing axis as the rotational center; and a second identical moving member for allowing the camera supporting device to perform the same motion as the twist axis, so that the rotational center of the camera supporting device is located on the rotational center of the twist axis.

Another apparatus for supporting according to the invention comprises: a rotational angle control motor which is attached to a robot wrist so that its output shaft coincides with the rotational axis of the twist axis and controls the angle of rotation of a fiber scope; a fiber scope supporting device attached to the output shaft of a reducer coupled with the output shaft of a rotational angle control motor; a tube having high rigidity into which the fiber scope is inserted and which couples a camera supporting device with the fiber scope-supporting device; a first identical moving member for allowing the camera supporting device to perform the same motion as the swing axis in the direction of the swing axis around the rotational center of the swing axis as the rotational center; and a second identical moving member for allowing the camera supporting device to perform the same motion as the twist axis so that the rotational center of the camera supporting device is located on the rotational center of the twist axis.

Since the highly rigid tube is clamped as a rigid member by the robot wrist (or fiber scope supporting device) and camera supporting device, even in the case of the driving of any of the swing and twist axes as well, the camera supporting device, tube, and fiber scope supporting device move integrally with the robot wrist. By controlling the angle of rotation of the fiber scope, the camera supporting device, tube, and fiber scope intergrally rotate around the robot wrist. Consequently, no external force is applied to the fiber scope inserted into the tube due to the rotation of the swing and twist axes and of the fiber scope, so that the angle of bend of the fiber scope is held to the angle of bend of the tube and no twist occurs.

The above and other objects, features and advantages of the present invention will be more apparent from the following detailed description in conjunction with the accompanying drawings:

BRIEF DESCRIPTION OF THE DRAWINGS

FIG. 2 is a perspective view illustrating the internal construction of the camera enclosing box 23 in FIGS. 1A and 1B;

FIG. 4 is a block diagram for a servo control at the position of the R axis.

DESCRIPTION OF THE PREFERRED EMBODIMENT

An embodiment of the present invention will now be described in detail hereinbelow with reference to the drawings using an example of a welding torch as one of the working tools. However, in place of the welding torch, a sizing gun, deburring tool, screw fatening tool, clamping hand, or similar equipment can be also used in an apparatus for supporting according to the invention. Therefore, it should be noted that the present invention is not limited only to welding applications.

Figure 1A:
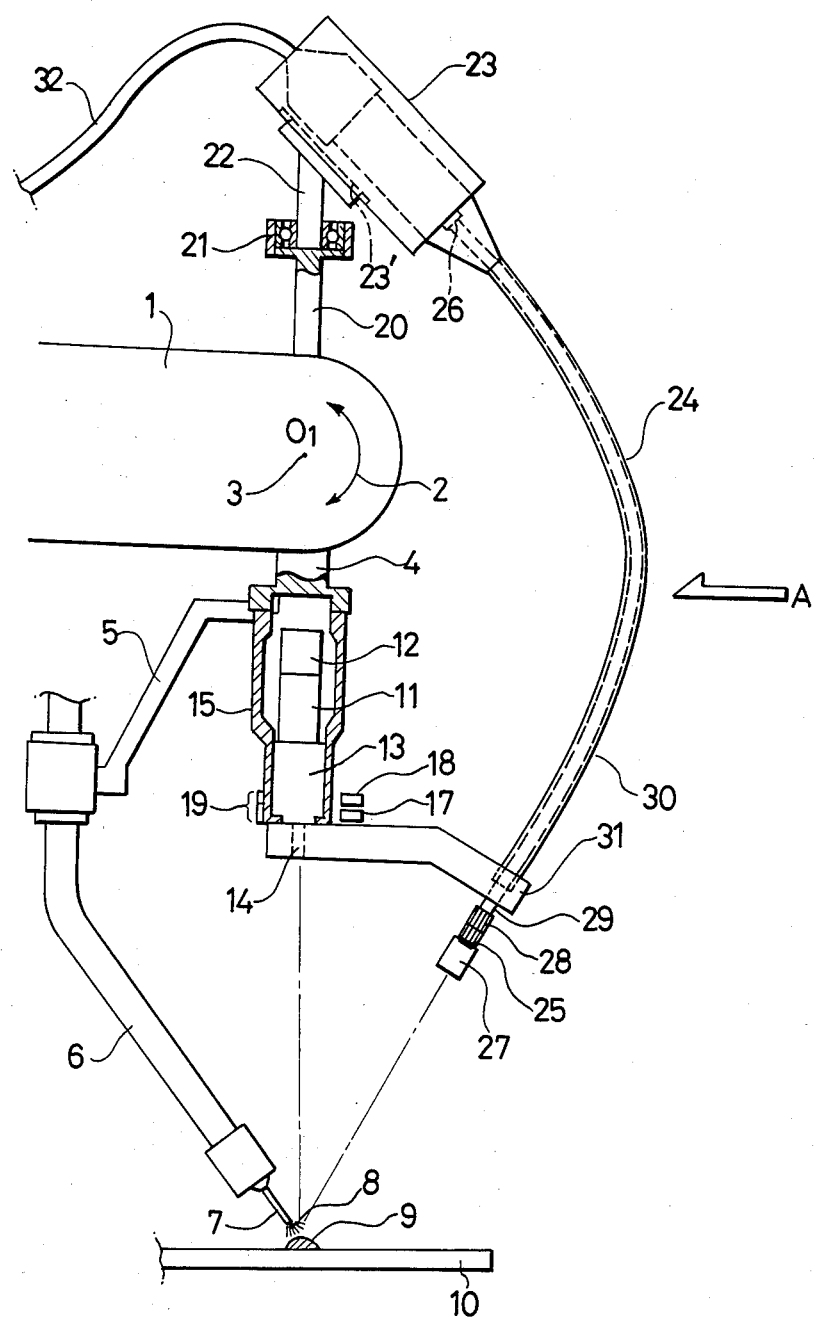
FIG. 1A is a partially cut-away front view of the main part of a welding robot according to an embodiment of the present invention.
Figure 1B:
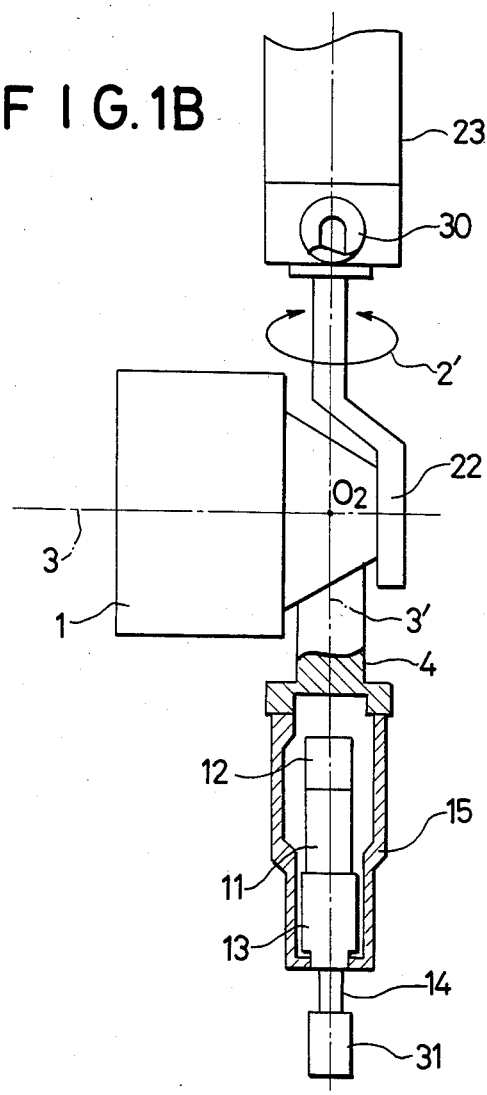
FIG. 1B is a partially cut-away perspective view of FIG. 1A when seen in the direction indicated by arrow A in FIG. 1A.

FIG. 1A is a front view of the main part of a welding robot of an embodiment of the invention. FIG. 1B is a perspective view of FIG. 1A when seen in the direction of arrow A. In the diagrams, 1 denotes an upper arm of the robot having two wrist axes; 2 is the direction of a wrist swing axis (hereinafter referred to as the B axis) which is rotated by a motor (not shown); 3 the rotational center O of the B axis; 2' the direction of a wrist twist axis (hereinafter referred to as the T axis) which is rotated by a motor (not shown); 3' the rotational center O of the T axis which passes through the rotational center 3 of the B axis and perpendicularly crosses the center 3; 4 a robot wrist to which the motions of the B axis 2 and T axis 2' are transferred; 5 a welding torch supporting rod coupled with the robot wrist 4; 6 a welding torch; 7 a wire electrode; 8 a welding arc; 9 a molten pool just under the welding arc 8; 10 a base material; 11 a rotational angle control motor to control the angle of rotation of the rotational axis (hereinafter referred to as the R axis) of a fiber scope 24, which will be explained hereinafter; 12 an encoder to detect the angle of rotation of the motor 11; 13 a reduction gear; 14 an output shaft of the reduction gear 13, i.e., an output shaft of the R axis; 15 a tubular casing to fix the reduction gear 13 to the robot wrist 4 such that the rotational center of the R axis (output shaft) coincides with the rotational center of the T axis; 16 a fiber scope supporting device fixed to the output shaft 14 of the motor 11 (i.e., the R axis); 17 an origin detecting limit switch attached to the fiber scope supporting device 16 to position the origin of the R axis; 18 an overrun limit switch to determined the limit position on the side opposite to the origin of the R axis motor 11; and 19 a dog fixed onto the tubular casing 15 for the limit switches 17 and 18. 20 indicates an attaching seat A vertically attached to the rotational center 3 of the B axis in such a manner that when the B axis 2 rotates, a camera enclosing box 23, which will be explained hereinafter, is rotated synchronously with the B axis 2 around the rotational center 3 of the B axis 2 as a rotational center. 21 represents a bearing in which the outer race is fixed to the attaching seat A and the rotational center of the inner race coincides with the rotational center of the T axis 2' and with the rotational center 3' of the R axis such that the inner race rotates synchronously with the rotation of the T axis 2'. 22 denotes an attaching seat B in which one end is fixed to the spigot of the inner race of the bearing 21 and the other end is fixed to the camera enclosing box 23 in a manner such that the camera enclosing box 23 is rotated synchronously with the T axos 2' and R axis motor 11 around the rotational center of the T axis and rotational center 3' of the R axis as rotational centers. As will be explained in detail hereinafter with reference to FIG. 2, the camera enclosing box 23 is fixed onto the attaching seat B 22 so that the center of gravity is located on the rotational center of the inner race of the bearing 21, rotational center 3' of the T axis, and rotational center of the R axis motor 11. Further, 24 denotes the fiber scope; 25 is an image pickup section on the object side of the fiber scope 24; 26 an image pickup section on the camera side of the fiber scope 24; 27 an object lens; 28 a focus adjustment screw; 29 an attaching metal fitting of the fiber scope 24; 30 a tube having high rigidity (e.g., steel tube) for coupling as a rigid member the fiber scope supporting device 16 with the camera enclosing box 23; 31 a fiber scope attaching section, which will be explained hereinafter in FIG. 3; 32 a cable to transmit a video signal (i.e., image pickup signal) to an image processor (not shown).

FIG. 2 is a perspective view illustrating the inner construction of the camera enclosing box 23. In the diagram, 33 denotes a camera image pickup section (e g., CCD image sensing chip section); 34 a camera lens; 35 a screw to attach the fiber scope 24; 36 a plurality of optical filters; 37 a rotary solenoid; 38 an on/off driving electric wire of the rotary solenoid; 39 a pole brace which operates in association with the motion of the rotary axis of the rotary solenoid 37; 40 the moving direction of the pole brace 39; 41 an attaching part to fix the optical filters 36 to the pole brace 39; X-X' an optical axis of the camera; 100 a cylindrical shutter to shut off the the optical axis having a small thickness formed of a material having a samll specific gravity (e.g., carbon fibers); 101 a shutter motor; 102 an output shaft of the shutter motor 101; and 42 a camera adapter which is formed by splitting and working part of a cylindrical body in order to make the optical filters 36 operative and inoperative and to attach the shutter motor 101. A control signal to turn on and off the camera video signal in accordance with the welding state is given to the shutter motor 101 from a shutter motor controller (not shown). In response to this control signal, the output shaft 102 of the shutter motor 101 is rotated by only a predetermined angle, thereby allowing the shutter 100 to turn on and off the camera video signal.

Figure 3B:
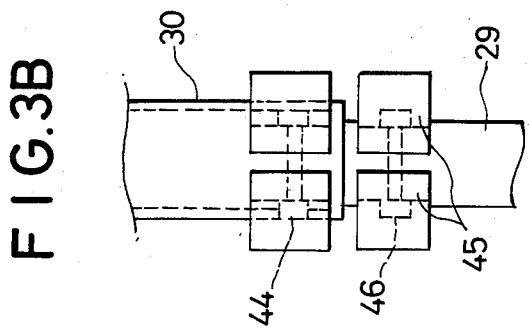
FIG. 3B is a perspective view of FIG. 3A when seen in the direction indicated by arrow B in FIG. 3A.
Figure 3A:
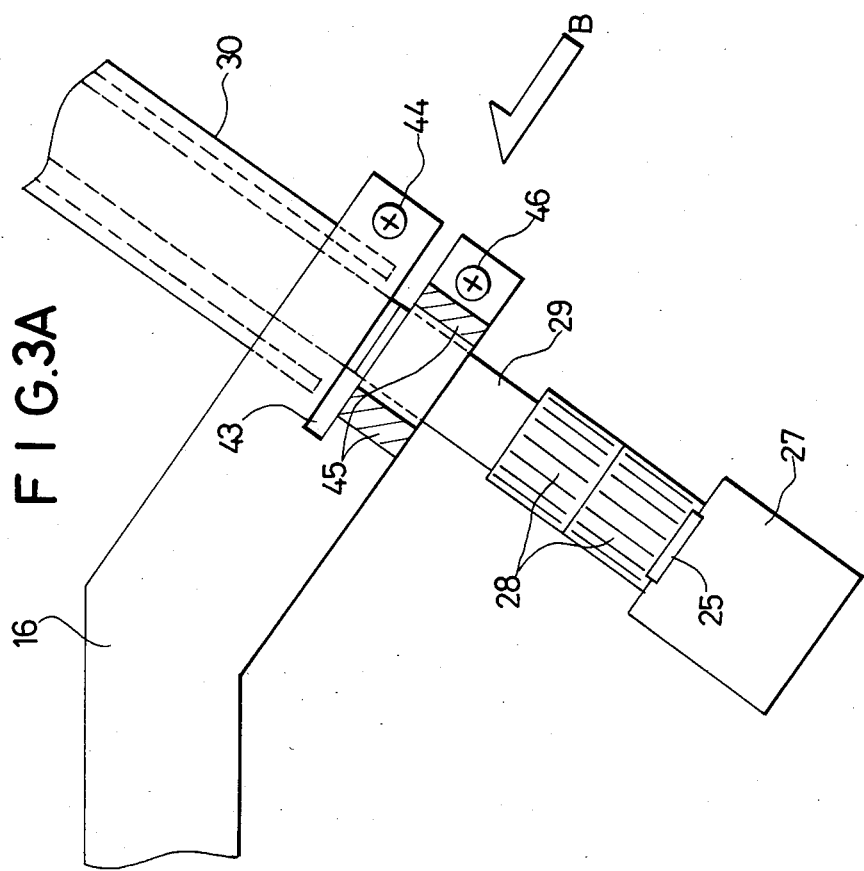
FIG. 3A is a detailed diagram showing the fiber scope-attaching section 31 in FIGS. 1A and 1B.

FIG. 3A is a detailed diagram of the fiber scope attaching section 31 in FIGS. 1A and 1B. FIG. 3B is a perspective view of FIG. 3A when seen in the direction of arrow B in FIG. 3A. In the diagrams, 43 denotes a split portion to individually attach the tube 30 and attaching metal fitting 29 having different outer diameters to the fiber scope supporting device 16. 44 is a screw to attach the tube 30; 45 a two-split collar to fix the fiber scope attaching metal fitting 29 having an outer diameter smaller than the tube 30; and 46 a screw to attach the collars 45.

FIG. 4 is a block diagram of a servo control of the R axis position. In the diagram, 50 denotes an R axis position command pulse; 51 a feedback pulse of the encoder 12; 52 a conventional position controller consisting of a deviation counter and a digital-to-analog (D/A) converter; 53 a conventional frequency-to-voltage (F/V) converter to generate a rotating speed signal of the R axis motor 11; 54 a speed feedback signal; 55 an analog speed command; and 56 conventional servo amplifier.

The operation of the embodiment will now be described.

When the welding arc 8 and molten pool 9 are observed, the rotary solenoid 37 is excited (turned on) through the electric wire 38 and a plurality of optical filters 36 are positioned on the camera optical axis X-X'. The optical information of the welding arc 8 and molten pool 9 transmitted through the objective lens 27, image pickup section 25, fiber scope 24, image pickup section 26, and camera lens 34 is filtered by the filters 36 so that the amount of light is reduced and an optical image is formed in the camera image pickup section 33. This optical information is transmitted to the image processor (not shown) by way of the cable 32 and image processed. The robot constitution axes are controlled on the basis of the signal after the image is processed. However, since the image processing method and the robot control method are not directly related to the feature of the present invention, their descriptions are omitted in this specification. When the shape of the base material in the extinguished state of the welding arc 8 is observed, the rotary solenoid 37 is turned off, the pole brace 39 is rotated, and all of the filters 36 are completely deviated from the camera optical axis X-X'. The other operations are substantially the same as those in the flow of the optical information described above.

When the welding arc 8 and molten pool 9 is observed, or when the shape of the base material is observed, three fundamental axes (not shown) of the robot, T axis 2', B axis 2, and R axis motor 11 are properly rotated to obtain the desired optical information. These three fundamental axes of the robot are used to three-dimensionally move the robot wrist 4, i.e., wire electrode 7. Since this motion is not directly related to the bend and twist of the fiber scope 24 as the feature of the invention, its description is omitted in this specification. The B axis 2 and T axis 2' are rotated such that the torch angle and the angle of forward/backward movement for the welding line (not shown) of the welding torch 6 are held to proper angles for welding. Separately, the R axis motor 11 is rotated so that the position of the welding torch 6 after the rotational angles of the B axis 2 and T axis 2' is suitably determined: in other words, the relative position between the direction of the wire electrode 7 and the welding line can be accurately observed by the object lens 27. The rotation control servo operation in this case is executed on the basis of a conventional servo loop shown in FIG. 4.

As described in FIGS. 1A and 1B, since the highly rigid tube 30 is clamped as a rigid member by the fiber scope supporting device 16 and camera enclosing box 23, each component part operates in the following manner:

(1) In the driving mode of the B axis:
The attaching seats A 20 and B 22, camera enclosing box 23, robot wrist 4, tubular casing 15, and fiber scope supporting device 16 move intergrally.

(2) In the driving mode of the T axis:
The robot wrist 4, tubular casing 15, fiber scope supporting device 16, camera enclosing box 23, attaching seat B 22, and the rotational center of the inner race of the bearing 21 move intergrally.

(3) In the driving mode of the R axis:
The fiber scope supporting device 16, camera enclosing box 23, attaching seat B 22, and rotational center of the inner race of the bearing 21 move intergrally.

Therefore, no external force is applied to the fiber scope 24 inserted in the tube 30 due to the driving of the T, B, and R axes. The angle of bend of the fiber scope 24 is held to the angle of bend of the tube 30 (this angle is set to a value below the allowable bending angle of the fiber scope 24), so that no twist occurs at all. In addition, as described in FIGS. 1A and 1B, since a groove 23' is formed in the camera enclosing box 23 in order to adjust the center of total gravities of the box 23 and tube 30, the load of the R axis motor 11 becomes only the inertial load which is reduced to the value which is a factor of the square of the reduction ratio of the reduction gear 13. Therefore, no weight load is applied and it is sufficient to use a samll-sized motor having a small capacity as the R axis motor 11.

Although the present invention has been shown and described with respect to a preferred embodiment, various changes and modifications which are obvious to a person skilled in the art to which the invention pertains are deemed to lie within the spirit and scope of the invention.

What is claimed is:

1. An apparatus for supporting in which a camera supporting device having a camera therein and a fiber scope are attached to and supported the wrist of a robot having a swing axis and a twist axis, comprising:
    a tube having high rigidity into which said fiber scope is inserted and which connects said camera supporting device with said robot wrist;
    first identical moving means for allowing the camera supporting device to perform the same motion as said swing axis in the direction of the swing axis around the rotational center of the swing axis as the rotational center; and
    second identical moving means for allowing the camera supporting device to perform the same motion as said twist axis such that the rotational center of the camera supporting device is located on the rotational center of the twist axis.

2. An apparatus according to claim 1, wherein said camera supporting device is formed with a groove adapted to adjust the center of gravity.

3. An apparatus according to claim 1 or 2, wherein a bearing is provided as said second identical moving means.

4. An apparatus according to claim 3, wherein an outer race of said bearing is coupled with an attaching seat which is vertical to the rotational center of the swing axis.

5. An apparatus according to claim 4, wherein said camera supporting device has an automatic filter switching device therein.

6. An apparatus according to claim 5, wherein said camera supporting device has a shutter switching device therein.

7. An apparatus according to claim 1, wherein said camera supporting device has an automatic filter switching device therein.

8. An apparatus according to claim 2, wherein said camera supporting device has an automatic filter switching device therein.

9. An apparatus according to claim 3, wherein said camera supporting device has an automatic filter switching device therein.

10. An apparatus for supporting in which a camera supporting device having a camera therein and a fiber scope are attached to and supported on the wrist of a robot having a swing axis and a twist axis, comprising:
    a rotational angle control motor, attached to said robot wrist such that its output shaft coincides with the rotational axis of said twist axis, for controlling the angle of rotation of said fiber scope;
    a fiber scope supporting device attached to an output shaft of a reduction gear coupled with the output shaft of said rotational angle control motor;
    a tube having high rigidity into which said fiber scope is inserted and which connects said camera supporting device with said fiber scope supporting device;
    first identical moving means for allowing the camera supporting device to perform the same motion as said swing axis in the direction of the swing axis around the rotational center of the swing axis as the rotational center; and
    second identical moving means for allowing the camera supporting device to perform the same motion as said twist axis such that the rotational center of the camera supporting device is located on the rotational center of the twist axis.

11. An apparatus according to claim 10, wherein said camera supporting device is formed with a groove adapted to adjust the center of gravity.

12. An apparatus according to claim 10 or 11, wherein a bearing is provided as said second identical moving means.

13. An apparatus according to claim 12, wherein an outer race of said bearing is coupled with an attaching seat which is vertical to the rotational center of the swing axis.

14. An apparatus according to claim 13 wherein said camera supporting device has an automatic filter switching device therein.

15. An apparatus according to claim 14, wherein said camera supporting device has a shutter switching device therein.

16. An apparatus according to claim 10, wherein said camera supporting device has an automatic filter switching device therein.

17. An apparatus according to claim 11, wherein said camera supporting device has an automatic filter switching device therein.

18. An apparatus according to claim 12, wherein said camera supporting device has an automatic filter switching device therein.

* * * * *